United States Patent [19]

Blore

[11] Patent Number: 4,539,337

[45] Date of Patent: Sep. 3, 1985

[54] BACKING MATERIAL

[76] Inventor: John C. B. Blore, 14 Cumberland Ave., Randburg, Transvaal, South Africa

[21] Appl. No.: 592,603

[22] Filed: Mar. 22, 1984

Related U.S. Application Data

[63] Continuation-in-part of Ser. No. 406,282, Aug. 9, 1982.

[30] Foreign Application Priority Data

Aug. 14, 1981 [ZA] South Africa ............... 81/5616

[51] Int. Cl.³ ................................................ C08J 9/10
[52] U.S. Cl. ........................................ 521/89; 521/92; 521/93; 521/94; 521/95; 521/138; 525/444
[58] Field of Search .............. 521/89, 92, 94, 95, 521/138; 525/444

[56] References Cited

U.S. PATENT DOCUMENTS 4,011,195  3/1977  Self ..................................... 521/138
4,314,036  2/1982  Throne ............................... 521/138

Primary Examiner—Morton Foelak
Attorney, Agent, or Firm—Barnes & Thornburg

[57] ABSTRACT

A backing material consisting essentially of a two part phthalallic polyester resin including an expansion agent and a filler in an amount to offset shrinking during curing.

11 Claims, 1 Drawing Figure

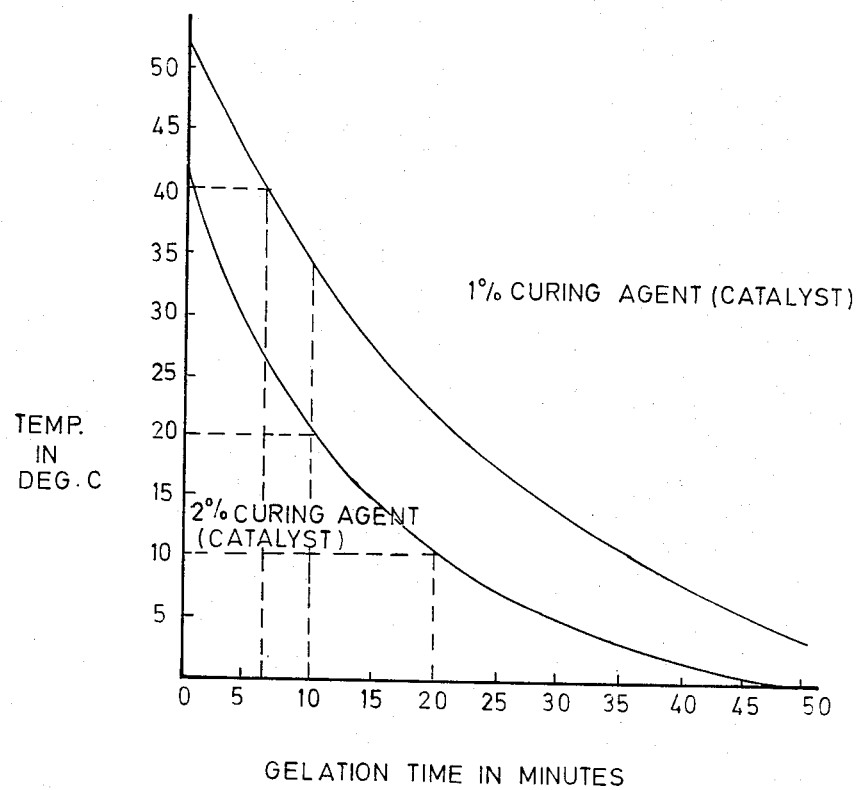
GELATION TIME IN MINUTES

BACKING MATERIAL

This application is a continuation-in-part of my copending application Ser. No. 406,282, filed Aug. 9, 1982.

The invention lies within the field of machines having wearing parts that are subjected to high-impact forces and are cushioned by a backing material means. An example of such a machine, and which is of particular interest in that the invention was developed in respect of such machines, is the gyratory crusher. In such crushers, the liners on both the bowl and mantle are so backed. But the invention has general application to other machines in which like problems are faced, although, for convenience, what follows will relate to crushers.

In earlier days, it was common practice to back the liners of gyratory crushers and other similar machines with a zinc insertion between the liner and the bowl or mantle. The insertion was usually made by pouring the zinc in a molten condition into a cavity between the liner and its supporting surface. This procedure was, for various reasons, less than ideal, and has been largely superseded by the use of epoxy resin compounds which are poured into the cavity together with a hardener. While epoxy resins are generally safer to handle than is molten zinc, epoxy resins are not fully satisfactory. The epoxy resins typically employed to form liner backing exhibit significant shrinkage as they set or cure, which shrinkage detracts from its backing function.

The object of the present invention is to provide an alternative backing material which has advantages over both zinc and epoxy resin.

According to the invention, the backing material comprises a blend of an unsaturated iso- or orthophthallic polyester resin with a bis-phenol A or prodendro bis-phenol A polyester resin, an expansion agent, and a filler. The bis-phenol A polyester resin acts as a flexibilizing agent to lower the brittleness of the blend from that which is typically exhibited by cast iso- or orthophthallic polyester resin. The weight ratio of phthallic polyester resin to flexibilizing agent is preferably between about 1.65 and 5.0. The flexibilizing agent together with the expansion agent permits the formation of a backing material having negligble shrinkage and dramatically superior mechanical properties.

The phthallic polyester resins are unsaturated polyesters which are stable at room temperature. When mixed with a monomer such as styrene, vinyltoluene, methyl methacrylate, diallyl phthalate, or triallyl cyanurate, the resin polymerizes in an exothermic reaction unless restrained by the presence of polymeryation inhibitors such as tert butyl catechol, hydroquinone, or other phenolic materials.

The term "brittleness" is intended to refer to the character or properties of a polymerized and cured polyester by which it is unable to withstand the mechanical shock loading to which a backing would be subjected in normal use. A polymerized phthallic polyester resin is found to be ineffective when used to form a backing material, but, with the blending of the phthallic resin with the flexibilizing agent, and preferably an expansion agent, in accordance with the present invention, a backing material is produced which combines the desired properties of toughness with resiliency that are well-suited to withstand such shock loading.

The phthallic polyester resins usable in the present invention are polymerized from orthophthalic anhydride or isophthalic acid. The phthalic acid is usually mixed with another dibasic acid such adipic acid, fumeric acid, or maleic anhydride. The acids combine through a condensation reaction with glycols such as propylene glycol, ethylene glycol, and diethylene glycol to form the polyester prepolymer which is cooled and then dissolved in the monomer.

The phthalic polyester resins include a prepolymer consisting essentially of about 30-40 wt. % phthalic acid, about 20-30 wt. % other dibasic acid, and 50-30 wt. % lower weight glycol. The preferred phthalic polyester resins and prepolymers consist essentially of about 36-38 wt. % orthophthalic anhydride, about 21-26 wt. % maleic anhydride, and about 43-36 wt. % propylene glycol. The polymer is formed from about 70 wt. % of the prepolymer dissolved in about 30 wt. % of a monomer, preferably styrene, and is hereinafter referred to as Resin I.

The flexibilizing agent is itself a polyester resin, namely a bis-phenol A or prodendro bis-phenol A polyester. The flexibilizing agent prepolymer consists essentially of about 15-35 wt. % phthalic acid, about 15-5 wt. % adipic acid, about 20-30 wt. % other dibasic acid, and about 50-30 wt. % bis-phenol A or prodendro bis-phenol A. The preferred flexibilizing agent prepolymer consists essentially of about 26-28 wt. % phthalic anhydride, about 10 wt. % adipic acid, about 21-26 wt. % fumaric acid, and 43-46 wt. % bis-phenol A. The flexibilizing agent is formulated from about 70 wt. % of the foregoing prepolymer dissolved in about 30 wt. % of a monomer compatible with the monomer employed in the formation of Resin I.

The physical characteristics of Resin I and the flexibilizing agent are as important as their chemical make-up. The preferred characteristics for each are listed in Table I set out below and are achieved by varying the concentration of the monomer and by the use of non-reacting thixotrophic agents such as pyrogenic silica.

TABLE I

| PREFERRED PHYSICAL PROPERTIES | | |
|---|---|---|
| | Resin I | Flexibilizing Agent |
| Viscosity at 25° C. | 280 centistokes | 9 poise |
| Specific gravity | 1.12-1.14 | 1.12-1.20 |
| Acid value | 18-30 mg KOH/g | 21 mg KOH/g |
| Volatile content | 32-39% m/m | 23% m/m |
| Gel time at 25° C. | 10-18 min. (with cobalt octoate) | 15 min. (with resins 100 pbw, MEK peroxide 2 pbw, accelerator E2 pbw where E is cobalt octoate or napthanate |

In accordance with the present invention, an expansion agent is included in the resin blend to combat any tendency of the resin blend to shrink on setting or curing. The expansion agent is preferably included in an amount which will exactly compensate for the shrinkage of the blend. The exact amount depends upon the exact composition of the resins, their acid values, and the condition of use.

The choice of expansion agent and the amount to be used can easily be empirically ascertained without undue experimentation. Suitable expansion agents include azo compounds such as sulfonyl hydrazide and metal bicarbonates, but isocyanate is preferred. The isocyanate group reacts with water from the condensation reaction to create carbon dioxide in the form of tiny bubbles distributed evenly throughout the backing material. The isocyanate also contributes to cross-linking in the blend as it cures, thus enhancing the strength while combating the brittleness of the starting resin.

In calculating the amount of isocyanate to be used, one must also realize that it is used in combination with a free radical source as an initiator and catalyst for the final reaction. The free radical source can be an organic peroxide such as methyl ethyl ketone hydroperoxide and is preferably aided by an accelerator such as cobalt octoate cobalt, naphthanate, or a tertiary amine. Since the amount of expansion required to compensate for cure shrink is small, only small amounts of the expansion agent are required. The amount of expansion agent required is generally less than 10 wt. % and preferably about 1–2½ wt. % of the total resin blend absent fillers.

A backing material in accordance with the present invention generally includes a filler. Suitable fillers are those which have an oil-absorption capacity that is sufficient to be "wetted-out" by the liquid constituents of the blend. Especially suited are, alternatively or additively:
  (1) A blend of calcium carbonate and magnesium carbonate of which the oil-adsorption factor is of the order of 16 g/100 g;
  (2) A high-grade barium sulphate of which the oil-absorption factor is of the order of 12 g/100 g.

When filler (1) is used alone, the flow property of the blend may be undesirably low. The addition of filler (2) improves that property and has the further commercial advantage that it results in a product of more uniform color than is the case when filler (1) is used alone.

To aid in the filler wet-out, a wetting agent is generally employed. Suitable wetting agents are long-chain polyoxyolifin sulphonate compositions with molecular weights of about 800 or greater. Silicon-water dispersions have also been used successfully for the same purpose.

A viscosity reducer, such as a stabilized styrene monomer, may be added to the blend, if it be necessary, but not above about 5% of the resins by weight. A greater proportion tends to make the backing brittle.

The invention is further illustrated by the following examples in which all parts and percentages are by weight unless otherwise indicated. These non-limiting examples are illustrative of certain embodiments designed to teach those skilled in the art how to practice the invention and to represent the best mode contemplated for carrying out the invention.

EXAMPLE I

A Resin I was formulated from 25% orthophthalic anhydride, 15% maleic anhydride, 30% propylene glycol, and 30% styrene monomer. The formulated resin also contained a trace amount (about 0.02%) of hydroquinone to act as an inhibitor to prevent premature polymerization. The formulated resin exhibited a viscosity of 280 centistokes at 25° C., a specific gravity of 1.13, an acid value of 24 mgKOH/g, a volatiles content of 35% m/m, and a gel time of 14 minutes when initiated with cobalt octoate.

A flexibilizing agent was formulated from 30% bisphenol A, 18% isophthalic acid, 7% adipic acid, 15% fumeric acid, and 30% styrene monomer with again a trace amount of a conventional polymerizaton inhibitor. The formulated flexibilizing agent exhibited a viscosity of 775 centistokes, a specific gravity of 1.16, an acid value of 21 mgKOH/g, a volatiles content of 23% m/m, and a gel time of 15 minutes when initiated with cobalt octoate.

A liner backing is formed by mixing 4.48 kg of the above-formulated Resin I and 1.92 kg of the above-formulated flexibilizing agent in a high-shear mixer with 14 kg of Filler (1) screened to a 20–200 mesh and 2 kg. of Filler (2) screened to a 150–200 mesh. The mixture is mixed with 5 g of polyoxyolifin sulphonate used as a wetting agent until all filler solids are fully wetted-out. 25 grams of cobalt octoate (accelerator), 80 grams of isocyanate (expansion agent), and 185 grams of methyl ethyl ketone (MEK) peroxide (catalyst) are added to the mixture. The mixture is quickly poured into the cavity behind the liner and allowed to cure.

The mixture is observed to gel about 13 minutes after the addition of the catalyst, and to exhibit negligible shrinkage when fully curred. The liner backing thus formed exhibited a satisfactory resistance to fracture fatigue when subjected to high-impact forces.

EXAMPLE II

To establish the gelation time of liner backing, resins in accordance with the present invention test samples consisting of 210 grams of the Resin I of Example I and 90 grams of the flexibilizing agent of Example I are prepared. The test samples are heated or cooled to selected temperatures and a curing agent in the amount of either 1% or 2% of MEK peroxide is added to each sample, and the gelation times observed. A graph of curing times related to amount of curing agent and temperature is presented in the accompanying drawing.

EXAMPLE III

An additional sample of liner backing resin prepared in accordance with Example II is mixed with 650 grams of filler (1) screened to a 20–200 mesh. 6 grams of MEK peroxide is added and gelation time is observed to be approximately the same as a comparably heated sample in Example II.

EXAMPLE IV

A Resin I was formulated from 29% orthophthalic anhydride, 19% maleic anhydride, 15% propylene glycol, 12% ethylene glycol, and 30% styrene. The formulated resin contained a trace amount of polymerization inhibitor. The formulated resin exhibited a viscosity of 250 centistokes, a specific gravity of 1.14, an acid value of 29 mgKOH/g, a volatile content of 32% m/m and a getl time of 18 minutes when initiated with cobalt naphthenatic.

Two kilograms of this Resin I and 400 grams of the flexibilizing agent of Example I were mixed with 3 kg of Filler (1) and 1.5 kg of Filler (2) screened in accordance with Example I. After the mixture has completely wetted the filler, 15 grams of isocyanate and 50 grams of MEK hydroperoxide are added to the mixture. The mixture is then poured into a test mold containing a liner element for a gyratory crusher and allowed to cure. The cured liner backing when tested for brittleness exhibits superior properties to conventional epoxy resins and negligible shrinkage.

EXAMPLE V

A flexibilizing agent is formulated from 28% prodeudro bis-phenol A, 17% isophthalic acid, 8% adipic acid, 17% fumaric acid, and 30% styrene. This flexibilizing agent exhibits a viscosity of 750 centistokes at 25° C., a specific gravity of 1.20, an acid value of 20 mgKOH/g, a volatile content of 22% m/m, and a gel time of 16 minutes after initiation with MEK hydroperoxide and a tertiary amine.

Two kilograms of the Resin I of Example IV and 1.2 kg of the flexibilizing agent of the present examples are mixed with 9.5 kilograms of Filler (1) and 160 grams of styrene monomer in a high shear mixer. A silicone-based wetting agent is added to enhance the wet-out of the resin blend on the filler. After the filler is completely wetted by the mixture, 190 grams of isocynate and 290 grams of benzoyl peroxide are added, and the mixture quickly poured between the mantel and liner of a crusher and allowed to cure in situ.

The carbon dioxide gas generated during the curing by the isocynate is observed to compensate for any shrinkage which might otherwise occur and render the cured backing material slightly shock-absorbent although quite rigid.

The various formulations given in the examples above may be varied within the ranges given below with generally satisfactory results so long as some attention is given to providing sufficient expansion agent to compensate for cure shrinkage and the flexibilizing agent is selected with a view to both chemical and physical properties as outlined above.

The formulations given above have been found to form a backing that meets all requirements laid down for both high-and low-impact applications within the ranges given below (in parts) by weight:

|  | Low | Optimum | High |
| --- | --- | --- | --- |
| Resin I | — | 19.87 | — |
| Flexibilizing Agent | 4.0 | 8.51 | 12.0 |
| Filler 1 | 30.0 | 62.08 | 95.0 |
| Filler 2 | — | 8.87 | 16.0 |
| Accelerator | — | 0.11 | 0.2 |
| Wetting agent | — | 0.23 | 0.5 |
| Expansion agent | 0.5 | 1.239 | 1.9 |
| Curing agent or catalyst | 1.0 | 2.9 | 5.0 |

Although the invention has been described in detail with references to certain preferred embodiments and specific examples, variations and modifications can be performed within the scope and spirit of the invention as described and as defined in the following claims.

What is claimed is:

1. A material especially adapted for use as a backing for the wearing parts of machines consisting essentially of:

a phthallic polyester resin consisting essentially of about 36–38 wt. % orthophthallic anhydride, about 21–26 wt. % maleic anhydride, and about 43–36% propylene glycol and a flexibilizing agent consisting essentially of about 30 wt. % styrene monomer and about 70 wt. % of a prepolymer consisting essentially of about 15–35 wt. % phthalic acid, about 15–5 wt. % adipic acid, about 20–30 wt. % other dibasic acid, and about 50–30 wt. % of a member from the group consisting of bis-phenol A, prodendro bis-phenol A, and mixtures thereof selected from the group consisting of bis-phenol A polyester resins and prodendro bis-phenol A polyester resins, the weight ratio of phthallic polyester resin to flexibilizing agent being between 1.65 and 5.0, an expansion agent present in an amount to compensate for the shrinkage of the polyester resin and flexibilizing agent during curing, and a filler present in an amount which can be wetted by the resin and flexibilizing agent.

2. The material of claim 1 wherein the phthallic polyester resin and the flexibilizing agent each include, prior to curing, a monomer selected from the group consisting of styrene, vinyltoluene, methyl methacrylate, diallyl phthalate, and triallyl cyanurate, the monomer being present in an amount of about 30 wt. % of the polyester resin and flexibilizing agent.

3. The material of claim 1 wherein the phthalic polyester resin has a specific gravity of between about 1.12 and 1.14 and an acid value of between about 18 and 30 mgKOH/g.

4. The material of claim 1 wherein the flexibilizing agent prepolymer consists essentially of about 26–28 wt. % phthalic anhydride, about 10 wt. % adipic acid, about 21–26 wt. % fumeric acid, and about 43–46% bis-phenol A.

5. The material of claim 1 wherein the flexibilizing agent has a specific gravity of between about 1.12 and 1.20.

6. The material of claim 2 wherein the expansion agent is selected from the group consisting of metal bicarbonates, sulfonyl hydrazide, and isocyanate, the expansion agent being presented in an amount between about 0.5 and 10 wt. % of the material excluding the filler.

7. The material of claim 2 wherein the filler is selected from the group consisting of powdered metal carbonates and metal sulphates having an oil-adsorption factor of between about 12 g/100 g and 16 g/100 g, the filler having been screened to a size of about 20–200 mesh.

8. The material of claim 1
   the expansion agent is present in an amount sufficient to compensate for the shrinkage of the polyester resins upon curing,
   the filler is present in the weight ratio of total polyester resin to filler being between about 0.25 and 1.1 and sufficient wetting agent to ensure that the filler is completely wetted by the resins,
   an accelerating agent and a catalyst.

9. The material of claim 8 wherein the accelerating agent is selected from the group consisting of cobalt octoate cobalt, naphthanate, and tertiaryamine.

10. The material of claim 8 wherein the catalyst is methyl ethyl ketone peroxide and the expansion agent is isocyanate, the isocyanate being present in an amount equal to between about 1 and 2.5 wt. % of the total resin content.

11. The material of claim 8 wherein the wetting agent is a long-chain polyoxyolefin suphonate.

* * * * *